United States Patent [19]

Kutnyak et al.

[11] 4,356,284

[45] Oct. 26, 1982

[54] THERMOPLASTIC COMPOSITIONS CONTAINING POLYVINYLIDENE FLUORIDE AND CHLORINATED POLYETHYLENE

[75] Inventors: Thomas A. Kutnyak; Mahendra N. Desai, both of Greenwood, S.C.; Roy A. Berman, Ashland, Ohio

[73] Assignee: Automation Industries, Inc., Greenwich, Conn.

[21] Appl. No.: 316,292

[22] Filed: Oct. 29, 1981

[51] Int. Cl.³ .................... C08L 23/28; C08L 27/08
[52] U.S. Cl. .................................. 524/520; 525/199; 525/192; 428/290; 428/411; 428/379; 428/421; 428/463
[58] Field of Search ............... 525/199, 192; 524/520

[56] References Cited

U.S. PATENT DOCUMENTS

| | | | |
|---|---|---|---|
| 3,076,781 | 2/1963 | Frey | 525/192 |
| 3,125,547 | 3/1964 | Blatz | 525/199 |
| 3,928,503 | 12/1975 | Hambsch et al. | 525/199 |

Primary Examiner—Carman J. Seccuro
Attorney, Agent, or Firm—Francis N. Carten

[57] ABSTRACT

Thermoplastic compositions comprising a resin admixture of chlorinated polyethylene with polyvinylidene fluoride are described. These compositions may be formed into a flexible film having particular utility as a laminate for web which may be employed under conditions requiring high stability and flame resistance.

8 Claims, 2 Drawing Figures

THERMOPLASTIC COMPOSITIONS CONTAINING POLYVINYLIDENE FLUORIDE AND CHLORINATED POLYETHYLENE

BACKGROUND OF THE INVENTION

The present invention relates a thermoplastic composition capable of formation into a flexible film. The composition additionally possesses properties of high stability and flame resistance making it suitable for, and superior to other compositions heretofor employed in, a variety of well known uses.

An exemplary such use and prior art composition is set forth in U.S. Pat. No. 3,872,041 of Marvin A. Koerber. That patent describes flexible ducts such as those utilized in distributing conditioned air throughout a building. Such ducts require a thermoplastic composition capable of forming a vapor resistant barrier. Moreover, the barrier must be physically and chemically stable, flame resistant and, in many embodiments, must serve various structural or bonding functions within the duct.

Koerber utilizes a thermoplastic composition composed primarily of a resin admixture of chlorinated polyethylene and polyvinyl chloride. That composition is highly satisfactory in most major respects. It is resistant to both flame and smoke; resistant to long term outdoor weathering, flexible at both low and elevated temperatures; impermeable to moisture; and processable by normal manufacturing methods at low cost. Unfortunately, however, it contains vinyl chloride monomer.

Studies have recently indicated the dangers of that monomer. As a result, materials containing even minimal amounts of vinyl chloride are being governmentally banned from many of the uses to which such thermoplastic compositions have previously been utilized. Included within the bans are such construction usages as air ducts.

Accordingly, it is an object of the present invention to discover a thermoplastic composition having the aforementioned properties, but which is also essentially free of vinyl chloride.

INTRODUCTION TO THE INVENTION

The thermoplastic compositions of the present invention comprise an intimate resin admixture of chlorinated polyethylene with polyvinylidene fluoride. This admixture can be processed into a flexible film (or sheet) having the desired properties described above. It will also provide the structural or bonding functions integral to forming composite articles such as certain air duct materials.

INTRODUCTION TO THE DRAWINGS

DESCRIPTION OF THE INVENTION AND DRAWINGS

Figure 1:
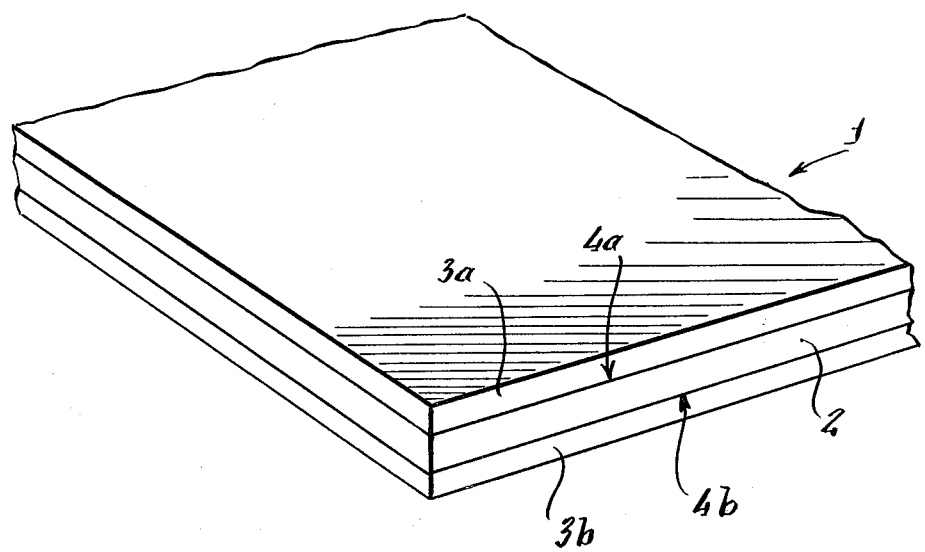
FIG. 1 depicts a laminate article of this invention having a ply of the present thermoplastic composition.

The present thermoplastic compositions are composed predominently of a resin admixture of chlorinated polyethylene and polyvinylidene fluoride. This resin admixture desirably comprises at least 40%, more preferably from 50 to 70, percent by total composition weight.

The chlorinated polyethylene of the instant compositions should be present in from 50 to 95, more desirably from 60 to 90, percent by total weight of thermoplastic resin. Within these ranges, the amount of chlorinated polyethylene may be varied freely.

The particular type of chlorinated polyethylene is not as important as its amount. For example, polyethylene having any degree of chlorination may be employed. Polymers having lesser amounts of chlorine are, however, softer and more rubbery. Consequently, polyethylene containing from 30 to 70, more desirably 35 to 50, percent chlorine by weight are preferred.

The molecular weight of the chlorinated polyethylene may vary broadly. In general, however, more desired composition properties are obtained where the molecular weight is between from 80,000 to 170,000.

The amount of polyvinylidene fluoride in the composition should range 5 to 50, desirably from 10 to 40, percent by total weight of thermoplastic resin. As with chlorinated polyethylene, the amount may be varied with these limits to accentuate given physical properties or facilitate processing.

The polyvinylidene fluoride utilized desirably has a molecular weight within the range of from 160,000 to 185,000. This imbues the resin admixture of the composition with optimum physical properties, yet still allows processing under conventional conditions.

Resin admixtures having the foregoing composition bear remarkably little resemblance to either of their principal constituents. Chlorinate polyethylene is rubber-like in character, while polyvinylidene fluoride is more crystalline, having a sharp melting point from a rigid state. Such resin admixtures, however exhibit a high component compatibility as well as the properties sought.

Many desirable properties for the present thermoplastic composition can be accentuated by incorporation of conventional additives. Flamability characteristics may, for example, be improved by inclusion of from 5 to 35 percent by resin weight of such flame retardants as antimony oxide and/or alumina hydrate. The alumina hydrates also provide significant reduction in smoke evolution.

Resin stabilizing compounds may also be present. From 1 to 5 percent by resin weight of heat and/or light stabilizers are preferred. Desirable heat stabilizers include conventional epoxy, organo-tin and organo-barium cadmium compounds. The former two of these compounds additionally protect against the adverse effects of ultraviolet light.

Other optional ingredients of the present compositions include plasticizers, lubricants and other conventional processing aids. These ingredients are utilized in known manner and desirably constitute from 1 to 10, percent by total composition weight.

A further and particularly preferred optional constituent of the present compositions is particulate inorganic filler. Such a filler—including calcium carbonate, talc or the like—serves to increase opacity, reduce surface tack and/or extend the thermoplastic composition. Filler may be employed in from 5 to 200, more preferably 10 to 50, percent by resin weight.

The thermoplastic compositions may be prepared by conventional means. Most conveniently, the composition ingredients may simply be combined and dry blended in a high shear mixer. This ensures uniformity of admixture.

After admixture, the composition may also be processed in accordance with a variety of known techniques. A dry blended admixture may, for example, be heated in a plasticating mixer to obtain a homogenous melt. Alternatively, the admixture may be melted and plasticated on a heated plastics mills.

The melted composition may then be calendered to produce a film or sheeting. In a preferred embodiment, it may also be coated directly on or into a web of fibrous insulating material to produce a laminate.

A representative such laminate is shown in FIG. 1. Therein, a laminate 1 such as a conditioned air duct material is shown. The laminate 1 is composed of a ply 2 of the present thermoplastic composition bonded to a web 3a such as a sheet of woven fiberglass. To ensure integrity between the ply 2 and web 3a, an optional thin coating of adhesive 4a is present to enhance the bond.

Also shown in FIG. 1 are an additional web 3b and coating 4b on the opposite surface of the ply 2. These represent optional layers which enhance the properties of the laminate 1.

The thermoplastic composition may also be extruded in conventional manner. A plasticized blend of the present ingredient may be extruded into strands and chopped to yield pellets. These may then be ground, or used as is, for further extrusion to produce a conventionally shaped article such as the coated wire depicted in FIG. 2.

Figure 2:
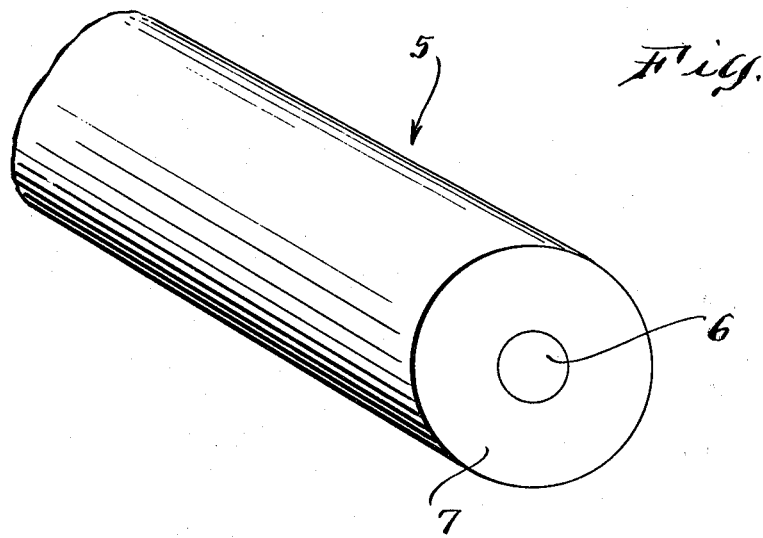
FIG. 2 depicts a wire article of this invention having a coating of the present thermoplastic composition.

In FIG. 2, a wire article 5 is shown. The wire article 5 is composed of a central core wire 6, usually composed of metal, and a peripheral coating 7 of the thermoplastic composition. Such an article 5 may be employed as a reinforcing coil for an air conditioning duct.

Where the present compositions are coated onto a similar plastic, attachment may be made by solvent welding, heat sealing or the like. For improved integrity and/or bonding to dissimilar materials, a thin layer or conventional adhesive which will adhere to both is generally employed.

The present invention may be more fully understood by reference to the following example which should be construed as illustrative and in no way to limit the scope of the present invention.

EXAMPLE

The following ingredients were blended in a heated plastics mill to produce 500 grams of thermoplastic composition:

| Ingredients | Percent by Weight |
| --- | --- |
| Resin | |
| Chlorinated polyethylene[1] | 46.96 |
| Polyvinylidene fluoride resin[2] | 11.74 |
| Lubricant | |
| stearic acid | 1.17 |
| fatty acid ester | 1.17 |
| calcium stearate | .29 |
| Antioxidant | |
| phosphite solution | 1.17 |
| Plasticizer | |
| epoxidized tallate | 1.17 |
| -continued | |
| Ingredients | Percent by Weight |
| polyethylene wax | 1.17 |
| Stabilizer | |
| organotin mercaptide solution | .47 |
| Processing Aid | |
| methacrylate resin copolymer | 2.93 |
| Flame Retardant | |
| chlorinated paraffin | 2.35 |
| antimony tri-oxide | 8.80 |
| Smoke Suppressant | |
| hydrated alumina | 8.80 |
| Filler | |
| calcium carbonate | 5.87 |
| talc | 5.87 |
| Coupling Agent | |
| organic titante solution | .04 |

[1]Molecular weight-80,000 to 170,000
Chlorine weight-42%
[2]Molecular weight-160,000 to 185,000

The composition, which may be extruded to produce a film or wire coating in conventional manner, had a Shore A typical hardness and specific gravity of 1.52 at 25° C. A sample was held in an oven for 60 days at 130° C. After this stressing period, the sample remained flexible and met UL-181 flame standards. These properties, in addition to the absence of vinyl chloride, recommend the composition as a superior air duct material.

The above mentioned patent is incorporated herein by reference. Obviously, modifications and variations of the present invention are possible in light of its and other known teachings. Representative changes include modification of one or more of the chlorinated polyethylene or polyvinylidene fluoride resins to include another monomeric constituent or use of the present compositions in differently configured articles than those depicted. It is therefore to be understood these and other changes may be made in the particular embodiments of the invention as defined by the appended claims.

What is claimed is:

1. A thermoplastic composition comprising an intimate resin admixture of from 50 to 95% of chlorinated polyethylene with from 50 to 5% of polyvinylidiene fluoride by total resin weight.

2. The composition of claim 1, wherein the chlorinated polyethylene contains from 30 to 70% chlorine by weight.

3. The composition of claim 1, wherein the chlorinated polyethylene has a molecular weight of from 80,000 to 170,000.

4. The composition of claim 1, wherein the polyvinylidene fluoride has a molecular weight of from 160,000 to 185,000.

5. The composition of claim 1, wherein the resin admixture is essentially free of vinyl chloride.

6. The composition of claim 1, wherein the resin admixture contains from 5 to 200% of particulate inorganic filler by resin weight.

7. The composition of claim 1, wherein the resin admixture comprises a flexible film.

8. The composition of claim 7, wherein the resin admixture comprises from 60 to 90% of the chlorinated polyethylene containing from 35 to 50% chlorine and from 10 to 40% of polyvinylidene fluoride by weight.

* * * * *